United States Patent [19]

Behr

[11] Patent Number: 4,727,329

[45] Date of Patent: Feb. 23, 1988

[54] METHOD AND SYSTEM FOR MEASURING DISPLACEMENT OF BURIED FLUID TRANSMISSION PIPELINES

[75] Inventor: Richard A. Behr, Richardson, Tex.

[73] Assignee: Atlantic Richfield Company, Los Angeles, Calif.

[21] Appl. No.: 831,011

[22] Filed: Feb. 19, 1986

[51] Int. Cl.⁴ .............................................. G01V 3/08
[52] U.S. Cl. .................................... 324/345; 324/226
[58] Field of Search .................. 324/67, 226, 326–329, 324/330, 331, 345; 343/450, 459; 364/420, 449, 460

[56] References Cited

U.S. PATENT DOCUMENTS 3,875,497  4/1975  Madsen ............................... 324/345

*Primary Examiner*—Reinhard J. Eisenzopf
*Assistant Examiner*—Walter E. Snow
*Attorney, Agent, or Firm*—Michael E. Martin

[57] ABSTRACT

The vertical and lateral displacement of sections of fluid transmission pipelines due to earth subsidence or heaving is determined using vertical and horizontal arrays of magnetometer sensors located spaced apart on a boom or support member for providing multiple readings of the earth's magnetic field intensity and the anomaly caused by the presence of the pipeline. True position of the sensors may be measured using stadia techniques or electromagnetic radiation signals transmitted from a reference point. The sensor array may be mounted on a landbased vehicle or suspended from a rotary wing aircraft to provide access to remote regions which may not be accessible to conventional equipment and techniques.

13 Claims, 5 Drawing Figures

U.S. Patent  Feb. 23, 1988  Sheet 2 of 2  4,727,329
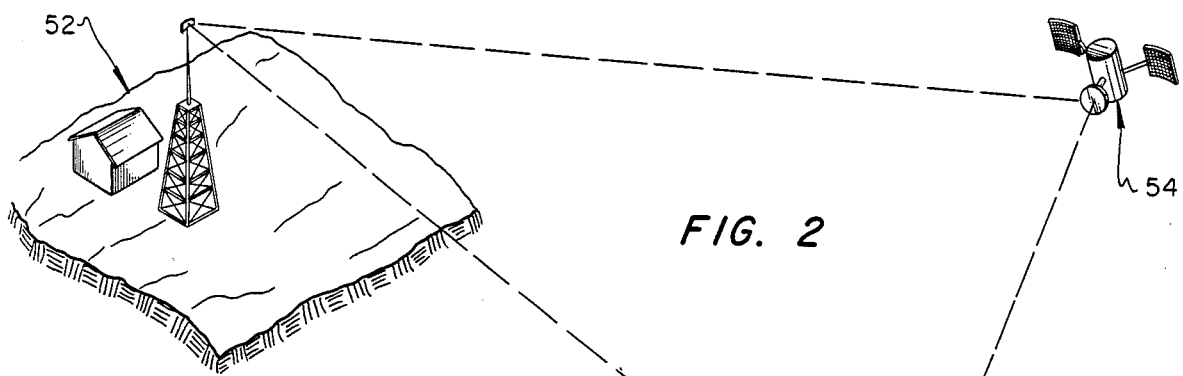
FIG. 2
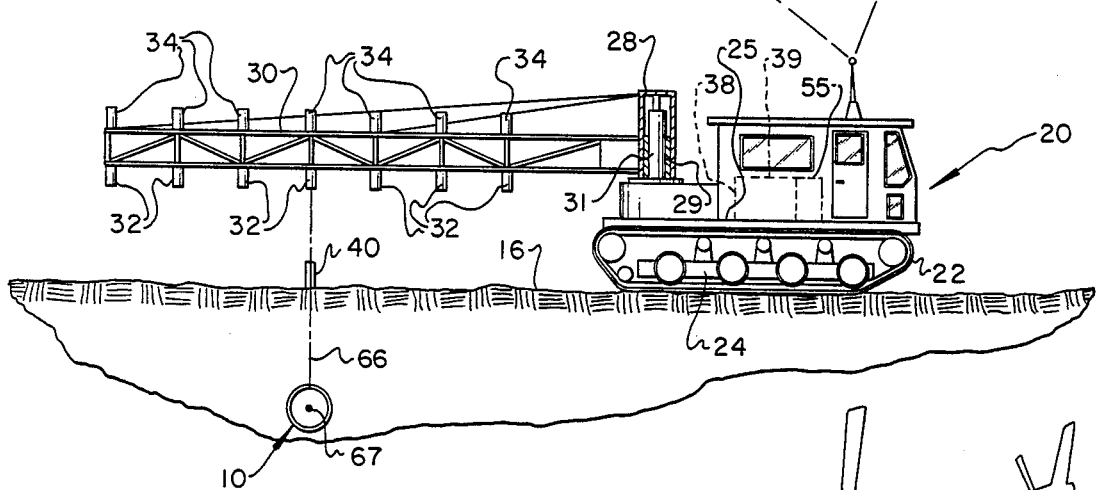
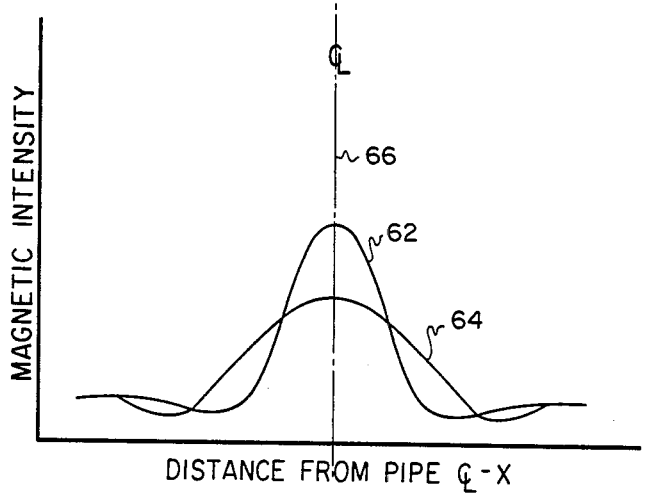
FIG. 3
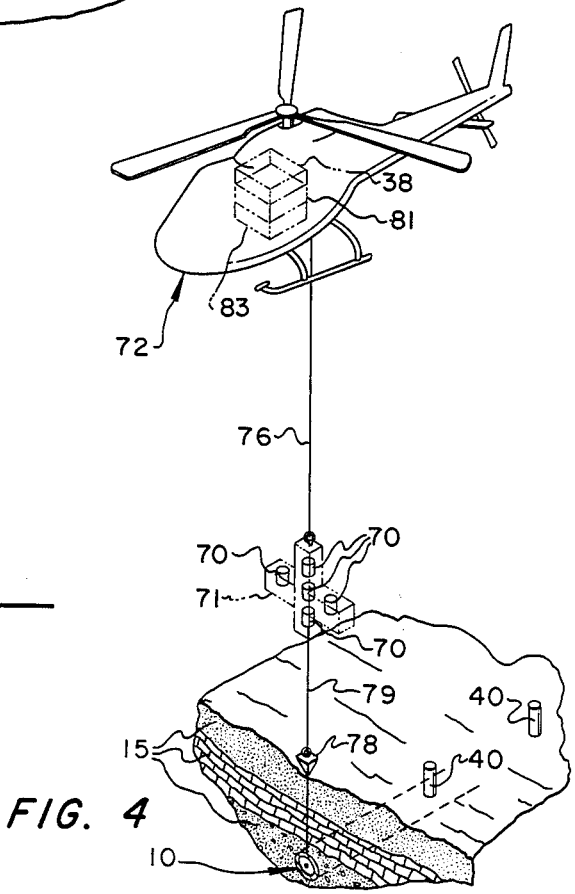
FIG. 4

METHOD AND SYSTEM FOR MEASURING DISPLACEMENT OF BURIED FLUID TRANSMISSION PIPELINES

BACKGROUND OF THE INVENTION

1. Field of the Invention

The present invention pertains to a method of determining changes in position of subterranean or submarine pipelines due to subsidence or other causes by making measurements of the magnetic anomaly created by the pipeline with respect to the earth's magnetic field.

2. Background

Changes in position and the resultant stresses exerted on buried fluid transmission pipelines are of constant concern from an environmental, as well as economic, standpoint. In many parts of the world, fluid transmission pipelines may require burial in unstable strata or in submarine locations which are subject to strong currents, ice movement or impact by ships or their ground tackle. Relatively slight movements of fluid transmission pipelines in the range of from less than one foot up to several feet should be capable of recognition and monitoring to avoid eventual line rupture and the substantial economic loss and environmental damage which might be caused as a result thereof.

Various techniques for measuring change in curvature and other parameters indicating movement of a section of fluid transmission pipeline have been contemplated, including traversing the line with a pipeline pig having onboard a fully gimballed inertial guidance system, measurements with surveyor's levels or transits to determine height changes of surveying rods attached to the pipe, acoustic emission techniques and radar surveillance.

Although it has been suggested that measurements of the intensity of the earth's magnetic field can be made for determining approximate locations of buried objects such as transmission pipelines, methods and apparatus relying solely on measuring the earth's magnetic field intensity to determine the precise location of a pipeline with respect to any vertical or lateral changes in position have not, it is believed, heretofore been attempted or developed. It is to this end that the present invention is directed with an object to provide an improved system for monitoring vertical as well as lateral displacements of sections of fluid transmission pipelines in various subterranean locations.

SUMMARY OF THE INVENTION

The present invention provides an improved method and system for measuring vertical and lateral displacements of a section of fluid transmission pipeline due to shifts in the earth's strata, for example, such as might be caused by cyclical thawing or frost heaving of the earth in the vicinity of the pipeline. In accordance with one aspect of the present invention an improved method and system is provided which includes means for measuring the intensity of a magnetic anomaly induced by the earth's magnetic field in the vicinity of a section of buried pipeline having an array of measurement devices supported above the section of pipeline in question by a land vehicle or aircraft, for example.

In accordance with another aspect of the present invention, a relatively precise method of measuring changes in position of a section of buried pipeline is carried out utilizing a land vehicle supported on the earth's surface above the section of pipeline in question, which vehicle is adapted to support a generally linear array of magnetometer sensors for making measurements of the intensity of the earth's magnetic field in a relatively rapid manner so as to minimize the effects of magnetic storms and diurnal changes in magnetic intensity, for example. The exact position of the sensor array may be obtained using surface based surveying equipment or electromagnetic radiation measurement techniques involving space or earthborne transmission and receiving stations.

In accordance with yet another aspect of the present invention, an improved method and system are provided for making measurements of change in position of a buried section of pipeline in relatively remote or inaccessible areas utilizing a sensor array supported by a vehicle such as a hovering aircraft or other suitable vehicle which may easily move relative to the generally inaccessible terrain for making measurements of any change in the position of a particular section of pipeline from a previously known position.

In accordance with still another aspect of the present invention, a method is provided for determining, with a relatively high degree of accuracy, the location of a buried section of fluid transmission pipeline by determining the position of an array of magnetometer sensors utilizing a surveyor transit and a benchmark situated in an area and of a type of construction which is not subject to frost heaving or subsidence or other movements of surface layers of the earth's strata. The location of the magnetometer sensor array may also be determined by electromagnetic navigation or position determining techniques such as a global positioning system. In preferred arrangements of the magnetometer array, the array may comprise a series of horizontally and vertically spaced apart magnetic field sensors supported by a vehicle and wherein the sensors may be moved vertically relative to the vehicle.

Those skilled in the art will further appreciate the abovedescribed features and advantages of the present invention, as well as other superior aspects thereof, upon reading the detailed description which follows in conjunction with the drawing.

BRIEF DESCRIPTION OF THE DRAWING

FIG. 2 is a transverse elevation view similar to FIG. 1, illustrating an alternate embodiment of a method for determining the location of the magnetometer sensor array;

FIG. 3 is a diagram showing the variation in the earth's magnetic field intensity with respect to vertical and horizontal positions of the magnetic sensors relative to the pipeline;

FIG. 4 is a vertical elevation view illustrating an alternate method of determining the position of a pipeline section; and FIG. 5 is a schematic diagram of a preferred configuration of a magnetometer and data acquisition system in accordance with the present invention.

DESCRIPTION OF THE PREFERRED EMBODIMENTS

Figure 1:
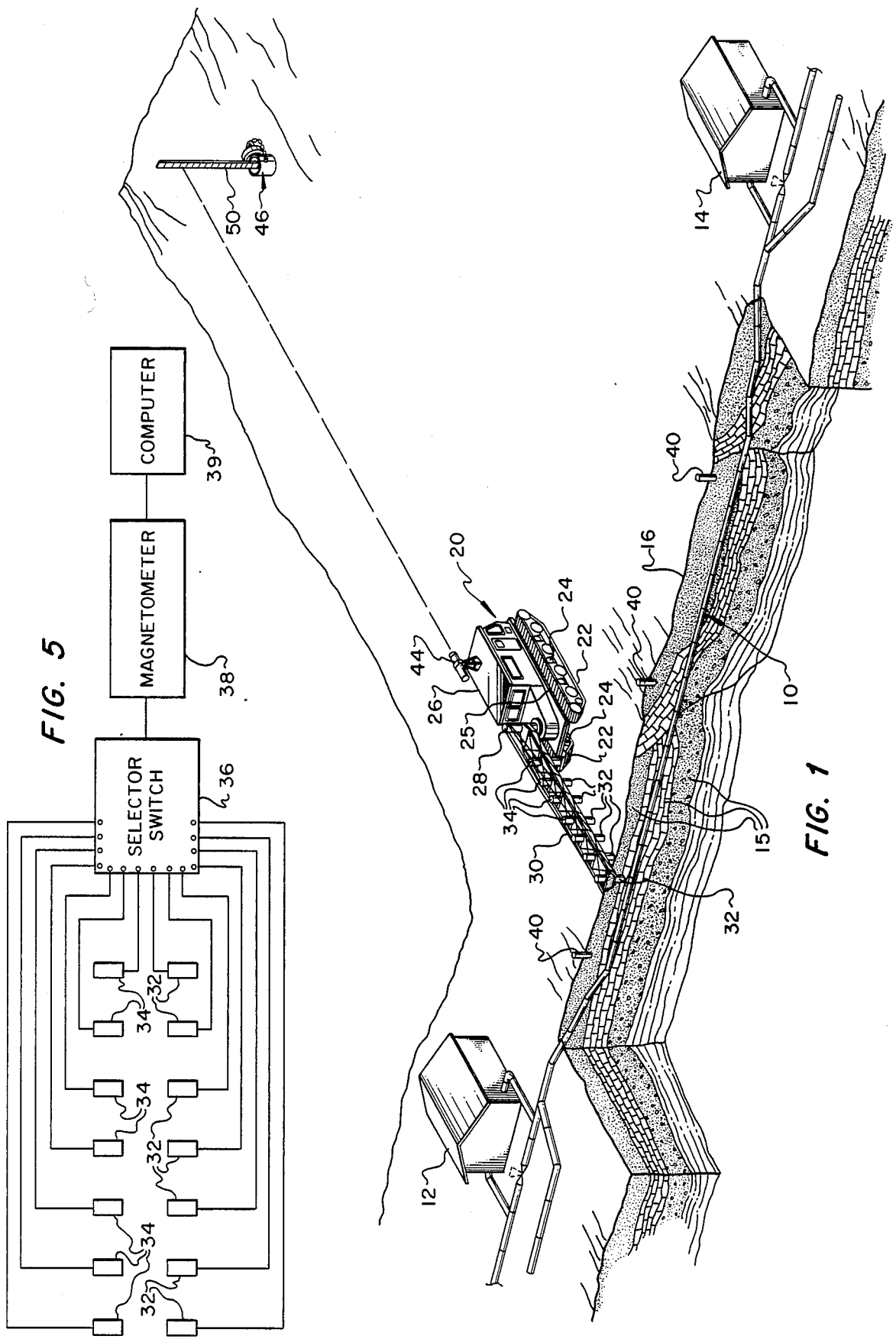
FIG. 1 is a perspective view of a section of fluid transmission pipeline whose position is being determined in accordance with the present invention.

In the description which follows, like parts are marked throughout the specification and drawing with the same reference numerals, respectively. The drawing figures are not necessarily to scale and certain features of the invention are shown exaggerated in scale or in somewhat schematic form in the interest of clarity and conciseness. Conventional elements are referred to, in many instances, by name only as the utilization of such elements in practicing the method of the present invention is believed to be within the purview of those skilled in the art.

Referring to FIG. 1, there is illustrated a section of fluid transmission pipeline, generally designated by the numeral 10, which is buried for a major portion of its length between pump stations 12 and 14 beneath the earth's surface 16. The transmission line 10 is subject to unwanted displacement with and relative to of the earth's strata 15 due to many factors, including cyclical freezing and thawing processes which are particularly severe in Arctic permafrost regions. Accordingly, it is desireable and necessary to measure, from time to time, displacements of the portion of the pipeline section 10 which is buried in order that corrective action may be taken well before displacements become severe enough to result in buckling or rupture of the pipeline itself. In accordance with the present invention, it is contemplated that the magnetic anomaly caused by interaction between the pipeline section 10 and the earth's magnetic field may be utilized to determine displacement of the pipeline relative to a known reference point.

Most fluid transmission pipelines are fabricated from steel which has a magnetic susceptibility several orders of magnitude greater than the earth's material in which the pipeline in buried. Moreover, the presence of ice, ground water and other factors which might influence the intensity of the earth's magnetic field does not interfere with the ability to measure and interpret the anomaly formed by interaction of the pipeline itself with the earth's magnetic field. Since the surficial location of a man-installed pipeline is generally known and the configuration of the pipeline, i.e., a horizontal cylinder, is known, the actual vertical height of a magnetic signal reading device or sensor from the axis of a cylindrical pipe may be obtained from the expression:

$$V = (2\pi R^2 I/z^2)(1 - [x/z]^2)/([1 + (x/z)^2]^2) \quad (1)$$

wherein: V=vertical component of magnetic intensity in gammas, R=the radius of the cylindrical element being measured, I=the intensity of the earth's magnetic field, z=the vertical height from the center of the cylinder, and x=the transverse distance from the longitudinal axis of the cylinder measured perpendicular to z. When x=0 (directly above pipe centerline) equation (1) may be solved for z wherein:

$$z = ([2\pi R^2 I]/V_{x=0}) \quad (2)$$

Moreover, for relatively long horizontally disposed cylindrical objects such as a pipeline, the burial depth may also be determined from the equation:

$$z = \Delta z / ([T_z/T_{z+\Delta z}]^{\frac{1}{3}} - 1) \quad (3)$$

wherein: z=the vertical distance from pipe centerline to the lowermost of a vertically arranged array of magnetometer sensors (z should preferably be at least 5 times pipe diameter to avoid ground-surface and near-zone magnetic noise), Δz=vertical distance between magnetometer sensors in a vertically arranged gradient array (Note: Δz should be about 1/10 of z), $T_z$=the magnetometer reading of the lower sensor, and $T_{z+\Delta z}$=the magnetometer reading of the upper sensor.

One advantage of vertical gradient measurements is that they automatically eliminate magnetic noise by virtue of the fact that magnetic noise is recorded simultaneously on all of the gradient sensors. Thus, only local, pipe induced magnetic anomaly data survive the differencing operations performed in gradient techniques. Again, as mentioned previously, the general location of a previously installed section of pipeline is known and it is usually possible to locate a magnetometer sensor array generally vertically over the previously known position of the pipe so that vertical displacements may be measured relative to elevation benchmarks and other reference points. Of course, horizontal displacements due to freezing and thawing processes and other shifting of the earth strata can also be determined utilizing reference to a known location or reference point.

Referring further to FIG. 1, a preferred method of determining the location of the buried portion of the section of pipeline 10 is carried out using an array of magnetometer sensors mounted on a landbased vehicle, generally designated by the numeral 20. The vehicle 20 may be configured as a self propelled, all terrain type vehicle, having spaced apart endless crawler tracks 22 suitably supported on track frame 24 and a main frame 25 which supports propulsion machinery, and an operator's cab 26. A generally vertically extending kingpost 28 is mounted on the vehicle 20 and supports a foldable or telescoping boom 30 which may be extended in a generally horizontal direction as indicated in the drawing figure. The kingpost 28 preferably is vertically extendable relative to the vehicle frame 25 and may include a guide member 29, FIG. 2, and a hydraulic cylinder actuator 31 disposed for extending the kingpost and the boom 30 vertically. The boom 30 supports a first row of horizontally spaced apart magnetometer sensor elements 32 and a second row of sensor elements 34 mounted above the first row.

Referring briefly to FIG. 5, the sensors 32 and 34 are each operably connected to a selector switch unit 36 which, in turn, is connected to a magnetometer 38 for conditioning and recording signals generated by the sensors 32 and 34. The selector switch unit 36 may be configured to selectively connect each of the sensors 32 and 34 in a predetermined sequence with the magnetometer 38 for conditioning and recording signals generated by the respective sensors. The magnetometer 38 may be operably connected to a digital computer 39 for processing and comparing the signals generated and conditioned by the magnetometer 38 and for producing graphical displays of the signals.

Further in accordance with the invention, the boom 30 is positioned generally transverse to the longitudinal trajectory or course of the pipeline section 10 and centered thereover utilizing benchmarks or surveying rods 40 which may be permanently positioned over the previously known course or position of the pipeline section 10. The boom 30 may be moved vertically relative the frame 25 to provide a selected number of readings from the sensor arrays on the boom. Moreover, in order to verify whether or not subsidence of the earth's surface in the vicinity of the vehicle 20 has occured, the elevation of the vehicle and the boom 30, as well as the magnetometer sensors 32 and 34, can be confirmed by conventional surveying techniques using a stadia telescope or transit 44 mounted in a known position on the vehicle 20 for determining the elevation of the vehicle relative to a benchmark 46 suitably remote from the course of the pipeline section 10 so as to not be influenced by the subsidence, heaving or other perturbations of the earth's surface in the vicinity of the pipeline. The benchmark 46 may be of a type such as disclosed and claimed in U.S. Pat. No. 4,403,459 to R. B. Hurlbut and assigned to the assignee of the present invention and is a preferred type of benchmark for use in Arctic regions and other regions of surface soil instability. A surveyor's rod 50 is illustrated in FIG. 1 as being supported on the benchmark 46 whereby the elevation of the array of sensors 32 and 34 with respect to the benchmark may be determined utilizing the transit 44.

Referring also to FIG. 2, the elevation of the boom 30 and the array of sensors 32 and 34 may also be determined by triangulation techniques utilizing electromagnetic radiation signals transmitted between the vehicle 20, a landbased signal transmitting and receiving station 52 and a satellite based signal transmitting and receiving station 54. Position determination utilizing the satellite based station 54 and suitable instrumentation 55 onboard the vehicle 20 may also be carried out using the NAVSTAR satellite based navigation system, or a similar global positioning system.

FIG. 3 illustrates the plots of the measurements of variations in magnetic intensity as measured by the array of sensors 32 and the array of sensors 34. The curve 62 is a plot of the measurements of magnetic intensity made by the array of sensors 32 which is closer to the pipeline section 10 than the array of sensors 34. The intensity of the magnetic field in the vicinity of the pipeline section 10 as measured by the array of sensors 34 is indicated by the curve 64. Accordingly, the maximum value of magnetic intensity measured by either the array of sensors 32 or the array of sensors 34 may be used to determine the vertical distance from the sensor array to the centerline of the pipe section 10 using equation (2). Alternatively, the vertical magnetic gradient relationship equation (3) may also be utilized to determine the vertical distance from the centerline or axis 67 of the pipe section 10 to the sensor 32 which is located directly on the centerline 66. Any shift of curves 62 or 64 indicating a lateral shift of the peak value of magnetic intensity measured by the array of sensors 32 and 34 from the centerline 66 may also be used to determine lateral displacements of the section of pipeline 10.

An alternate method of measuring changes of displacement of the pipeline section 10 is illustrated in FIG. 4 wherein a generally vertically and horizontally arranged gradient array of magnetic intensity sensors 70, similar to the sensors 32 and 34, is shown disposed on a housing 71 and suspended from a rotary wing aircraft 72 capable of hovering above the buried portion of the pipeline section 10 above a previous known location of the pipeline. Typically, the array of sensors 70 is suspended by a cable 76 having a suitable plumb weight 78 depending from the sensor array. The array of sensors 70 is positioned at a known height above the earth's surface 16 as provided by a predetermined length of cable 79 interconnecting the housing 71 with the plumb weight 78. The signals generated by the respective sensors 70 can be utilized in equation (3) to solve for the vertical distance from the pipe centerline to the position of the lowermost sensor 70 in the array supported by the housing 71.

The aircraft 72 might also utilize the global positioning system method of determining its position or an available hyperbolic type electronic navigation system for determining its position in space. FIG. 4 illustrates an electromagnetic radiation signal receiver 81 onboard the aircraft 72 which is adapted to receive signals from two sets of master and slave stations, not shown, for providing a navigational fix. A second electromagnetic radiation signal receiving unit 83 on board the aircraft 72 might be adapted to receive signals from a satellite based station or a landbased station suitably remote from the earth's surface directly above the pipeline 10 for determining the altitude of the aircraft 72 relative to these respective stations.

The magnetometer 38 including the sensors 32, 34 and 70 may be one of several types although a preferred type is a proton precession type magnetometer such as one manufactured by EG&G Geometrics of Sunnyvale, Calif. A Model G-856A magnetometer manufactured by this company provides 0.1 gammas sensitivity, 1.0 gammas total field accuracy, and 12 kilobytes of nonvolatile memory which can be transferred directly to a general purpose computer for data reduction and presentation. The switching device 36 is preferably a sequential start pulse generator which is used to control sampling from the various sensors in the respective arrays shown for the embodiments of the invention illustrated in FIGS. 1, 2 and 4.

It will be appreciated from the foregoing description that a unique process for determining relatively finite displacements of fluid transmission pipelines from their prescribed positions in subterranean locations has been provided by the present invention. The apparatus and techniques illustrated and described are particularly useful for making depth measurement changes of pipelines buried in Arctic and other remote regions of the earth and are readily adaptable for use in making measurements in conjunction with submarine pipelines. Although preferred embodiments of the invention have been described in detail herein, those skilled in the art will recognize that various substitutions and modifications may be made to the specific arrangements shown and illustrated without departing from the scope and spirit of the invention as recited in the appended claims.

What I claim is:

1. A method for determining the position of a section of fluid transmission pipeline which is disposed beneath the earth's surface in such a way as to generally preclude visual inspection, comprising the steps of:

providing magnetometer means including sensor means for recording the intensity of the earth's magnetic field at a predetermined point in space and means for receiving a signal generated by said sensor means;

positioning said sensor means with respect to a generally known location of said section of pipeline and taking readings with said sensor means of the magnetic field intensity at a selected number of positions of said sensor means spaced apart in the vicinity of said generally known location wherein the position of said section of pipeline is indicated by a magnetic anomaly in the magnetic field measured by said sensor means;

determining the location of said sensor means with respect to a predetermined known lateral position of said section of pipeline;

determining the elevation of said sensor means with respect to a reference point generally removed from the immediate vicinity of said section of pipeline; and determining the vertical distance from said sensor means to said section of pipeline by measuring the magnetic intensity of the magnetic field at said selected number of positions for establishing the elevation of said sectin of pipeline with respect to said reference point for successive measurements of any change in position of said pipeline or for determining any change in position of said section of pipeline from a previous known elevation of said section of pipeline with respect to said reference point.

2. The method set forth in claim 1 wherein:
the step of determining the elevation of said sensor means includes determining the elevation of said sensor means relative to a benchmark disposed at a reference point on the earth's surface sufficiently distant from the location of said sensor means as to not be subject to subsidence or heaving of the ground surface over said section of pipeline.

3. The method set forth in claim 1 wherein:
the step of determining the elevation of said sensor means includes measuring electromagnetic radiation signals to determine the location of said sensor means in space.

4. The method set forth in claim 1 wherein:
said sensor means is supported on a vehicle and includes at least one array of sensors spaced apart along a generally horizontal line from each other and on opposite sides of a vertical plane through said section of pipeline, and said method includes the step of taking measurements of the magnetic field intensity at each of said sensors to develop a graphical display of magnetic field intensity versus lateral position of said sensors with respect to said plane whereby the lateral position of said section of pipeline is determined by the maximum value of magnetic intensity indicated by said display and the vertical distance of said section of pipeline from said generally horizontal line is computed using said maximum value of magnetic intensity.

5. The method set forth in claim 4 including the step of:
providing a second array of sensors vertically spaced from said first array of sensors and taking measurements of the intensity of the earth's magnetic field at each of said sensors of said second array,
determining the maximum magnetic field intensity value as measured by respective ones of sensors of said first array and said second array, and
computing the vertical distance of the centerline of said section of pipeline to the one sensor in the first array based on the signal intensity measured by both of said respective ones of said sensors.

6. The method set forth in claim 1 including the steps of:
providing a vertically spaced array of sensors comprising said sensor means, suspending said array of sensors from a rotary wing aircraft located generally above said section of pipeline at a predetermined elevation with respect to the earth's surface,
reading the magnetic intensity sensed by each of the sensors in said array of sensors, and
computing the vertical distance of said section of pipeline from a selected one of said sensors using the value of magnetic intensity read by said selected one of said sensors.

7. A method for determining the position of a section of fluid transmission pipeline which is disposed in such a way as to generally preclude visual inspection, comprising the steps of:
providing magnetometer means including a vertically spaced array of sensors for recording the intensity of the earth's magnetic field at a predetermined point in space and means for receiving signals generated by said sensors, respectively;
positioning said sensors with respect to a generally known location of said section of pipeline;
determining the elevation of said sensors with respect to a reference point generally removed from the immediate vicinity of said section of pipeline;
measuring the magnetic intensity sensed by at least two vertically spaced apart sensors of said array of sensors and measuring the vertical spacing between said two vertically spaced apart sensors; and
calculating the vertical distance from the lower one of said two vertically spaced apart sensors to said section of pipeline for establishing the elevation of said section of pipeline with respect to said reference point for successive measurements of any change in position of said section of pipeline or for determining any change in position of said section of pipeline from a previous known elevation of said section of pipeline with respect to said reference point.

8. Apparatus for determining the location of a section of fluid transmission pipeline disposed beneath the earth's surface including;
a vehicle including sensor means mounted thereon for providing a plurality of readings of the earth's magnetic field intensity at spaced apart points;
means for determining the elevation of said vehicle with respect to a reference point so as to determine any changes in elevation of the earth's surface generally directly over said section of pipeline; and
means for recording said plurality of signals generated by said sensor means for determining the point of maximum magnetic field intensity based on measurements of magnetic field intensity made by said sensor means whereby the vertical distance between said sensor means and said section of pipeline at the point of measurement of said maximum magnetic field intensity may be determined.

9. The apparatus set forth in claim 8 wherein:
said sensor means includes an array of vertically spaced sensors and means for positioning said array at a known elevation from the earth's surface.

10. The apparatus set forth in claim 8 wherein:
said means for determining the elevation of said vehicle includes means for receiving electromagnetic radiation signals.

11. The apparatus set forth in claim 8 wherein:
said vehicle includes elongated boom means adapted to project over a generally known position of said section of pipeline and said sensor means comprises,
a first array of sensor means comprising spaced apart sensors disposed on said boom means, said sensors being spaced apart generally horizontally when said boom means is positioned for reading the intensity of the earth's magnetic field in the vicinity of said section of pipeline; and
a second array of sensor means including a plurality of sensors disposed generally vertically above said sensors of said first array for reading the intensity of the earth's magnetic field at spaced apart points along a generally horizontal line.

12. The apparatus set forth in claim 8 including:
means on said vehicle for moving said sensor means vertically relative to said pipeline to provide a vertical gradient of said magnetic field intensity.

13. A method for determining the position of a section of fluid transmission pipeline which is disposed in such a way as to generally preclude visual inspection, comprising the steps of:

providing magnetometer means including a horizontally spaced array of sensors for recording the intensity of the earth's magnetic field at a predetermined point in space and means for receiving signals generated by said sensors, respectively;

positioning said sensors with respect to a generally known location of said section of pipeline and taking readings with said sensors of the magnetic field intensity;

determining the true position of said sensors with respect to a reference point generally removed from the immediate vicinity of said section of pipeline; and calculating the vertical distance between the one of said sensors indicating the maximum value of magnetic intensity resulting from the perceived presence of said section of pipeline and said section of pipeline for establishing the elevation of said section of pipeline with respect to said reference point for successive measurements of any change in position of said section of pipeline or for determining any change in position of said section of pipeline from a previously known position of said section of pipeline with respect to said reference point.

* * * * *